Inventor
John M. Whelton
By his Attorney
Thomas J Ryan

June 19, 1956 J. M. WHELTON 2,750,608
INSEAM TRIMMING MACHINES
Filed Feb. 15, 1955 3 Sheets-Sheet 3

Inventor
John M. Whelton
By his Attorney
Thomas J. Ryan

United States Patent Office 2,750,608
Patented June 19, 1956

2,750,608

INSEAM TRIMMING MACHINES

John M. Whelton, Peabody, Mass., assignor to United Shoe Machinery Corporation, Flemington, N. J., a corporation of New Jersey Application February 15, 1955, Serial No. 488,347

7 Claims. (Cl. 12—82)

The present invention relates to machines for performing trimming operations on shoe bottoms, and is herein illustrated in its application to machines for trimming the inseams of Goodyear welt shoes. A machine of this type is disclosed in United States Letters Patent No. 1,226,872, granted May 22, 1917, on an application filed in the name of Andrew Eppler. It is to be understood, however, that in certain aspects thereof the invention is not limited to machines for trimming the inseams of Goodyear welt shoes but is applicable generally to trimming machines which operate progressively about the shoe bottom to remove excess material therefrom.

It is an object of the present invention to provide a trimming machine having an improved organization of cutting elements arranged to facilitate and expedite the removal of the material cut from the inseam substance and to afford a high degree of uniformity in the height of the inseam substance remaining after the trimming operation.

With this object in view the present invention consists in the provision in a machine for operating progressively about a shoe bottom, of a rotary cutter and a rotor having a shearing edge constructed and arranged to cooperate with the cutter to trim excess material from a shoe bottom. In order to provide for the removal of waste material in small increments facilitating the transmission thereof to a waste receptacle by a suitable suction means, the trimming instrumentalities provided by the present invention include a rotary chopping cutter which is preferably driven at high speed so that the chips removed thereby will be small enough to be carried away readily by suction. In order to provide for a proper shearing action between the rotary cutter and the rotary shearing member the shearing member is constructed and arranged to rotate on an axis located in a plane perpendicular to the axis of the rotary cutter. In accordance with a further feature of the invention the rotary cutter has a terminal cutting edge which operates along a line generally parallel to the shoe bottom and a second cutting edge generally perpendicular to the terminal cutting edge. In the illustrated organization the terminal cutting edge acts against a first shearing member which preferably is the rotary shearing member above referred to and the second cutting edge operates against a second shearing member which, in the illustrated organization, is a fixed shear block.

In the illustrated organization the rotary shearing member serves also as a means for feeding the shoe past the cutting point. It is to be understood, however, that the invention is not limited to an organization in which the rotary shearing member is also a work feeding instrumentality, since the invention in its broadest aspect contemplates the provision of a rotary shearing member which has not work feeding function.

In accordance with a further feature of the invention the rotary shearing member is constructed and arranged to engage the outer surface of the inseam substance and the rotary cutter is so arranged that its cutting edges move widthwise of the inseam substance from the inner surface to the outer surface thereof.

These and other features of the invention will now be described with reference to the accompanying drawings and pointed out in the appended claims.

Figure 1:
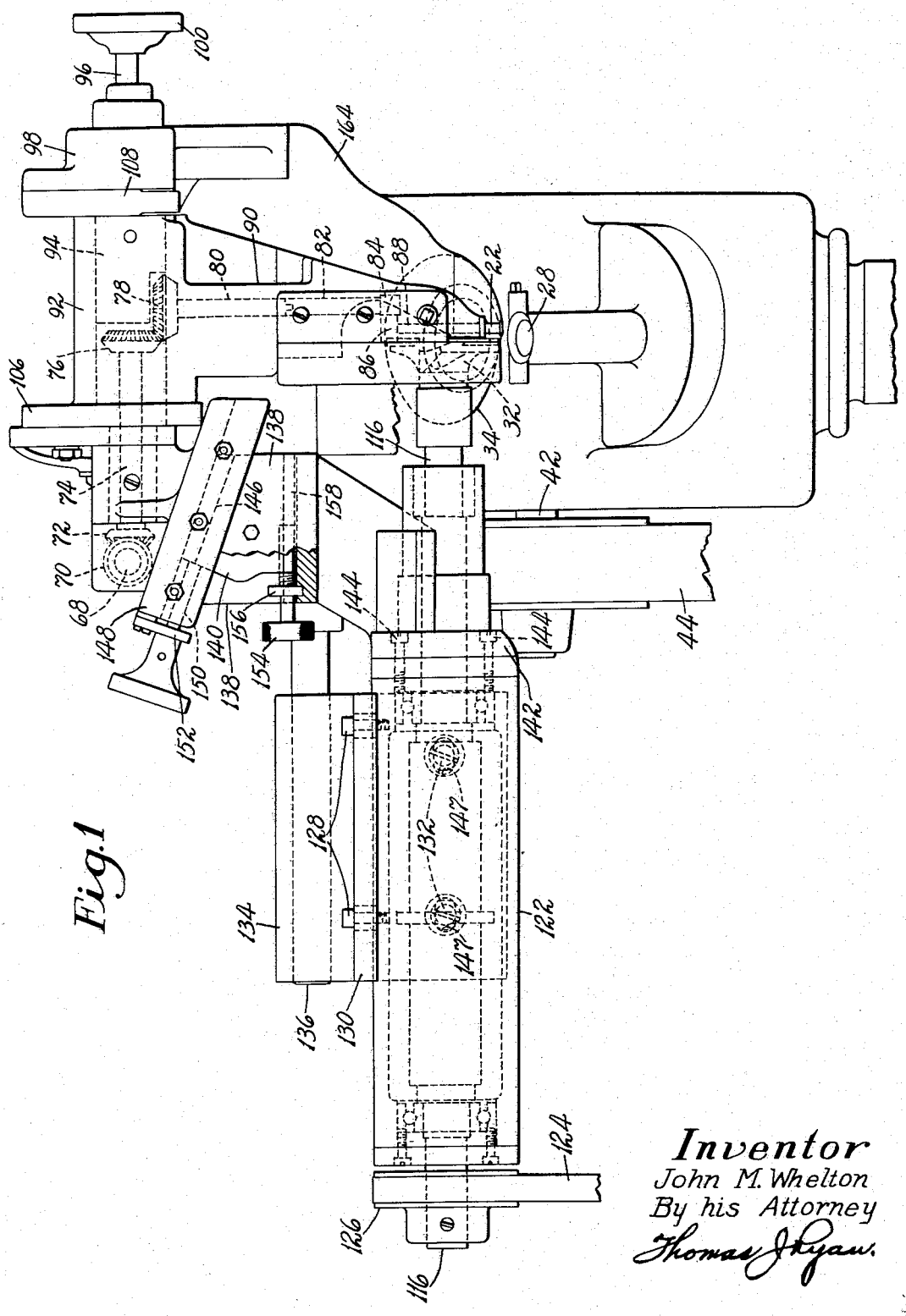
Fig. 1 is a front elevation of the head of a machine embodying the features of the present invention.
Figure 2:
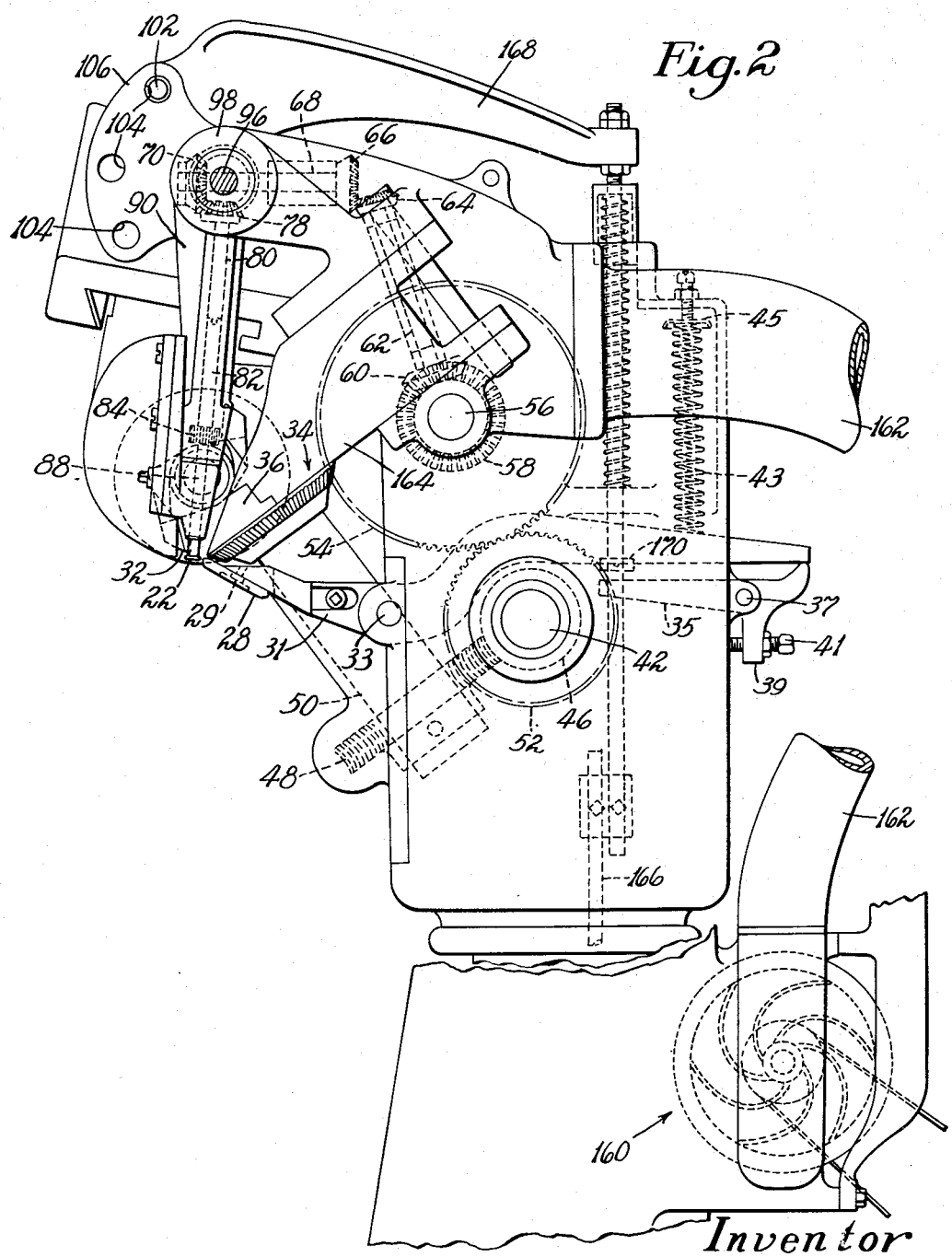
Fig. 2 is a right side elevation of the head of the machine illustrated in Fig. 1.
Figure 4:
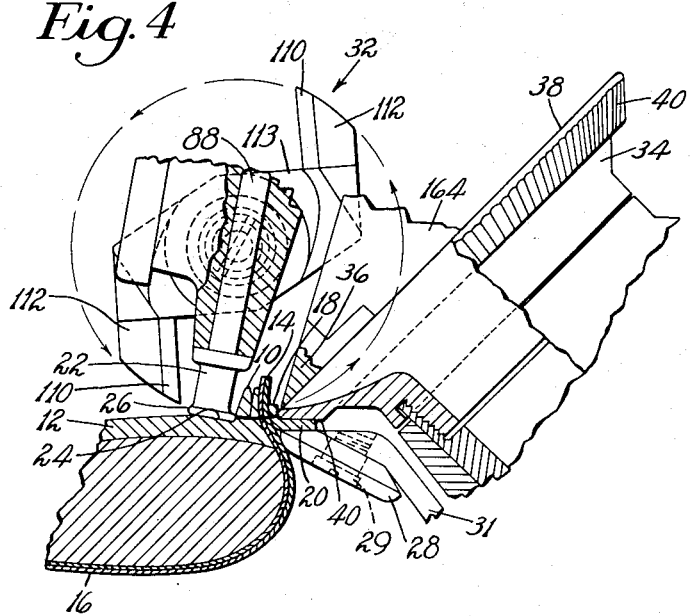
Fig. 4 is an enlarged view in right side elevation illustrating the operating instrumentalities and, in section, a portion of a shoe being operated upon.

Referring to Figs. 1 and 2, the invention is illustrated as embodied in a machine for trimming the inseams of Goodyear welt shoes, the inseam, as illustrated in Fig. 4, being the shoe bottom substance comprising the rib 10 of a channeled insole 12, the lasting margin 14 of a shoe upper 16 and the inner margin 18 of an outsole attaching welt 20. At the toe end of the shoe the inseam substance includes the bottom margin of the toe stiffener, if any, and at the heel end of the shoe the inseam substance includes the bottom margin of the counter.

The shoe is located relatively to the operating instrumentalities of the machine by manually bringing it into its position illustrated in Fig. 4. In this position the shoe is located heightwise by the engagement of a driven rotor or rib guide 22 in the inside channel 24 of the insole 12 and by the engagement of the flanged lower end portion 26 of the rotor 22 with the insole rib 10. At the operating point the shoe is supported against downward movement by a rotor or welt crease guide 28 having a quarter round edge face which engages the upper along a line adjacent to the welt and a frusto-conical edge face which engages the upper attaching face of the welt substantially in the welt crease. The rotor 28 is freely mounted on a headed screw 29 in the left end portion of an arm 31 (Fig. 2) mounted to swing on a fixed fulcrum 33. At its right end the arm 31 bears against the upturned end portion of a lever 35 fulcrumed at 37 and having a downwardly extending ear 39 which carries an abutment screw 41. By adjusting the abutment screw the position of the rotor or welt crease guide 28 relatively to the operating instrumentalities may be adjusted vertically. Upward pressure is applied to the rotor 28 by a spring 43 confined between an abutment member 45 and the right end portion of the arm 31.

The trimming operation is performed by a rotary chopping cutter 32 which makes a horizontal cut to sever a chip from that portion of the inseam substance below the trimming line and a vertical cut to sever the chip from the inseam substance above the trimming line, the shoe being positioned in the machine bottom upwards. In making the horizontal cut the cutter 32 operates in conjunction with a rotary shear member 34 and in making the vertical cut the cutter 32 operates in conjunction with a fixed shear member or block 36. The illustrated shear member 34 is a tubular member of relatively large diameter having a flaring upper end portion which terminates in a frusto-conical portion having an inner shearing edge 38 arranged to cooperate with the cutter 32. In the illustrated organization the outer surface of the frusto-conical portion is provided with teeth 40 which engage the outsole attaching surface of the welt 20 and cooperate with the rotor or rib guide 22 to feed the inseam progressively through the operating station in order to cause the point of operation to be transferred progressively about the margin of the shoe bottom.

For operating the work feeding rotor or rib guide 22 and the rotary shear member 34 the illustrated machine is provided with power driven mechanism which is substantially the same as the mechanism disclosed in the Eppler patent above referred to for driving similar operating instrumentalities. Referring to Fig. 1, a main shaft 42 is driven by a belt 44. As shown in Fig. 2, the shaft 42 has mounted thereon a worm 46 which meshes with a worm gear 48 fixed to the tubular shank portion 50 of the shear member 34. For actuating the rotor 22 the shaft 42 has fixed thereto a spur gear 52 which meshes with a spur gear 54 fixed to a shaft 56. Also fixed to the shaft 56 is a bevel gear 58 which meshes with a bevel gear 60 fixed to the lower end of a shaft 62. Fixed to the upper end of the shaft 62 is a bevel gear 64 which meshes with a bevel gear 66 fixed to the rear end portion of a horizontal shaft 68. Fixed to the forward end portion of the shaft 68 is a bevel gear 70 which meshes with a bevel gear 72 (Fig. 1) fixed to the left end portion of a shaft 74 which has fixed to its right end portion a bevel gear 76 which meshes with a bevel gear 78 at the upper end of a shaft 80. At its lower end the shaft 80 is coupled to a shaft 82 having at its lower end a pinion 84 which meshes with a pinion 86 fixed to the upper end portion of a shaft 88 which has fixed to its lower end the rotary feed member 22. In order to provide access to the cutter 32 and to enable insertion of a shoe in the machine that portion of the work feeding assembly comprising the rotor 22, and the shafts 80, 82 and 88 are mounted in an arm 90 which swings forwardly and upwardly on a horizontal axis. At its upper end the arm 90 has a hub 92 secured to a head 94 at the left end of a shaft 96 journaled in the frame portion 98. A handle 100 on the shaft 96 provides a convenient means for swinging the arm 90. The arm 90 is held in any one of three positions by a pin 102 (Fig. 2) mounted in an upward extension of the machine frame and arranged to register with any one of three holes 104 in a flange 106 extending forwardly from the hub 92. When it is desired to adjust the arm 90 the shaft 96 and the assembly mounted thereon are shifted to the right as seen in Fig. 1 to disengage the pin 102 from the hole 104 in which it is mounted. Space for such shifting movement is provided by raising a spacer member 108 which is normally positioned between the frame portion 98 and the right end of the hub 92.

Figure 3:
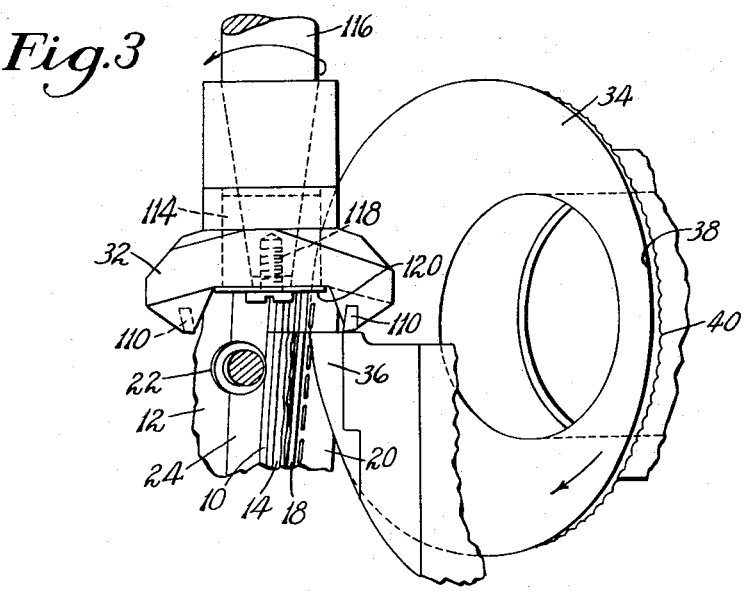
Fig. 3 is an enlarged plan view illustrating the cutting elements in conjunction with a portion of a Goodyear welt shoe.

Referring to Fig. 3, the rotary cutter 32 comprises two cutting blades 110 mounted in suitable recesses in the rotor 32 and secured therein by friction. The blades 110 are preferably made of any of the well known cemented tungsten carbides. Each blade 110 has two cutting edges one of which makes a horizontal cut to sever the chip from the permanent portion of the inseam substance. The second cutting edge of the blade 110 is arranged at right angles to the first cutting edge and operates to sever the chip from the upper or waste portion of the inseam substance. As shown in Fig. 4, each blade is mounted in the end portion of an arm 112 arranged at an obtuse angle to the hub 113 of the rotor. The rotor 32 is mounted on a ferrule 114 (Fig. 3) mounted on the tapered end portion of a shaft 116 and secured thereto by a screw 118 mounted in the end portion of the shaft and having a head which bears against a washer 120. Referring to Fig. 1, the shaft 116 is mounted in suitable bearings in a tubular housing 122 and is driven by a motor (not shown) through a belt 124 operating on a pulley 126 fixed to the outer end portion of the shaft 116. The housing 122 is secured by headed screws 128 to an angle bracket 130 which is secured by screws 132 to a bracket 134 slidably mounted on a fixed horizontal shaft 136. The bracket 134 and the assembly mounted thereon are held against swinging movement on the shaft 136 by a yoke 138 secured to the right end portion of the housing 122 and arranged in sliding engagement with the opposite side faces of a slide 140. The yoke 138 is held against vertical movement relatively to the slide 140 by flanges 158 extending in opposite directions from the lower portion of the slide 140 into horizontal grooves in the yoke 138. To provide for the attachment of the yoke 138 to the housing the yoke terminates at its lower end in a vertical ring 142 through which headed screws 144 extend into tapped holes in the housing 122. At its upper end the slide 140 terminates in oppositely extending flanges 146 which incline downwardly to the right as seen in Fig. 1. The flanges are mounted for sliding movement in grooves in a channel shaped head 148 formed in the machine frame. After releasing the screws 132 the slide 140 and the cutter assembly may be adjusted in the plane of the flanges 146, within the limits afforded by slots 147 in the bracket 130, by the operation of a hand screw 150. The hand screw is mounted in a tapped hole in the slide 140 and is held against bodily movement by a yoke 152 fixed to the head 148. It will be understood that the operation of the hand screw 150 serves to adjust the rotary cutter 32 relatively to the shear member 34 and the shear block 36 to compensate for the wear of the cutting elements. Proper adjustment of the rotary cutter in most cases requires an adjustment in a horizontal line in conjunction with the adjustment by the hand screw 150. In the illustrated organization such horizontal adjustment is readily effected by the operation of a hand screw 154 which is mounted in a horizontal tapped hole in the lower portion of the slide 140 and is provided with a flange 156 which operates in a groove in the base of the yoke 138 thereby to advance the yoke together with the cutter assembly relatively to the slide 140. Such sliding movement of the yoke is directed and guided by the flanges 158 projecting in opposite directions from the lower portion of the slide 140 into grooves in the yoke.

The chips removed by the rotary cutter are carried away from the cutting station by suction created by a fan 160 which is connected by a duct 162 to a funnel member 164 which has an opening in the vicinity of the cutting station.

In order to facilitate the introduction of a shoe into the machine the rotor or rib guide 22 is movable to the left, as seen in Fig. 2, and the work supporting rotor or welt crease guide 28 is movable downwardly by the operation of a treadle (not shown) which imparts downward movement to a link 166 which acts on an arm 168 extending rearwardly from the head 94 to impart clockwise swinging movement to the arm 90. The link 166 extends through a notch in the left end portion of the lever 35. During the downward movement of the link a collar 170 mounted on the link engages the lever 35 and swings it in a counterclockwise direction thereby imparting swinging movement in the same direction to the arm 31 thus imparting downward movement to the work supporting rotor 28.

Having thus described my invention, what I claim as new and desire to secure by Letters Patent of the United States is:

1. In a machine for operating progressively about a shoe bottom, the combination, with work feeding means, of a rotary cutter comprising a plurality of blades each having a first cutting edge and a second cutting edge, a first shearing member constructed and arranged to cooperate with said first cutting edge, and a second shearing member constructed and arranged to cooperate with said second cutting edge.

2. In a machine for trimming excess material from a shoe bottom, a rotary chopping cutter having a terminal cutting edge constructed and arranged to operate on a line generally parallel to the bottom of a shoe presented to the cutter and having a second cutting edge generally perpendicular to the terminal cutting edge, a rotary shear member constructed and arranged to cooperate with the terminal cutting edge of the chopping cutter, and a fixed shear block constructed and arranged to cooperate with the second cutting edge of the chopping cutter.

3. In an inseam trimming machine, the combination with a work supporting rotor constructed and arranged to engage the upper attaching surface of the welt of a Goodyear welt shoe, and a rotary feed member constructed and arranged to engage the inner surface of the inseam substance of the shoe, of a rotary cutter comprising a plurality of chopping blades each having a first chopping edge for making a cut generally parallel to the shoe bottom and a second chopping edge generally perpendicular to the first chopping edge, a rotary shear member constructed and arranged to cooperate with said first chopping edge, and a shearing member constructed and arranged to cooperate with said second chopping edge.

4. In an inseam trimming machine, the combination with a first feed member constructed and arranged to engage the inner portion of the inseam substance of a Goodyear welt shoe, a second feed member constructed and arranged to engage the outer portion of the inseam substance, and a work supporting member constructed and arranged to engage the upper attaching surface of the welt, of a rotary cutter comprising a plurality of chopping blades constructed and arranged to move widthwise of the inseam substance from the inner surface to the outer surface thereof, the second feed member being characterized by the formation therein of a shearing edge constructed and arranged to cooperate with the chopping blades.

5. In an inseam trimming machine, a rotary cutter comprising a plurality of chopping blades each having a first chopping edge for making a cut generally parallel to the bottom of a shoe presented to the cutter and a second chopping edge generally perpendicular to the first chopping edge, a first shear member constructed and arranged to cooperate with said first chopping edge and a second shear member constructed and arranged to cooperate with said second chopping edge.

6. In an inseam trimming machine, a rotary cutter comprising a plurality of chopping blades each having a terminal chopping edge for making a cut generally parallel to the bottom of a shoe presented to the cutter and a second chopping edge generally perpendicular to the terminal chopping edge, a rotary shear member constructed and arranged to cooperate with said terminal chopping edge and a shear block constructed and arranged to cooperate with said second chopping edge.

7. In an inseam trimming machine, the combination, with work feeding means and a work supporting rotor constructed and arranged to engage the upper attaching surface of the welt of a Goodyear welt shoe, of a rotary cutter comprising a plurality of chopping blades each provided with a hardened cutting element having a first chopping edge and a second chopping edge arranged at an angle to the first chopping edge, a first shearing member constructed and arranged to cooperate with said first chopping edge and a second shearing member constructed and arranged to cooperate with said second chopping edge.

References Cited in the file of this patent
UNITED STATES PATENTS

| | | |
|---|---|---|
| 1,210,148 | Cesar | Dec. 26, 1916 |
| 1,210,454 | Gagne | Jan. 2, 1917 |
| 1,268,477 | Lerch et al. | June 4, 1918 |
| 1,652,694 | Ballard | Dec. 13, 1927 |